(12) United States Patent
Hambeck et al.

(10) Patent No.: US 9,810,901 B2
(45) Date of Patent: Nov. 7, 2017

(54) APPARATUS AND METHOD FOR DRIVING AND MEASURING A MEMS MIRROR SYSTEM

(71) Applicant: TriLite Technologies GmbH, Neutal (AT)

(72) Inventors: Christian Hambeck, Gerersdorf (AT); Joerg Reitterer, Vienna (AT); Franz Fidler, Vienna (AT)

(73) Assignee: TriLite Technologies GmbH, Vienna (AT)

( * ) Notice: Subject to any disclaimer, the term of this patent is extended or adjusted under 35 U.S.C. 154(b) by 21 days.

(21) Appl. No.: 14/692,985

(22) Filed: Apr. 22, 2015

(65) Prior Publication Data

US 2015/0316762 A1 Nov. 5, 2015

(30) Foreign Application Priority Data

Apr. 30, 2014 (EP) .................................... 14166714

(51) Int. Cl.
*G02B 26/08* (2006.01)

(52) U.S. Cl.
CPC ....... *G02B 26/0833* (2013.01); *G02B 26/085* (2013.01)

(58) Field of Classification Search
CPC ... G02B 26/085; G02B 26/0833; G02B 26/08
USPC ........................ 359/199.3, 200.7, 199.1, 900; 250/234–236; 318/119
See application file for complete search history.

(56) References Cited

U.S. PATENT DOCUMENTS

2009/0262314 A1 10/2009 Nishigaki et al.
2009/0284190 A1 11/2009 Matsubara et al.

FOREIGN PATENT DOCUMENTS

| EP | 1515424 | 3/2005 |
|---|---|---|
| JP | H10 207973 | 8/1998 |
| WO | WO 2011/095231 | 8/2011 |

OTHER PUBLICATIONS

European Search Report from priority application dated Nov. 11, 2014.

*Primary Examiner* — James Phan
(74) *Attorney, Agent, or Firm* — Hoffmann & Baron, LLP

(57) ABSTRACT

The present invention relates to an apparatus for driving and measuring a MEMS mirror system, the MEMS mirror system having a mirror pivotable around an axis by a driving coil and exhibiting a resonance frequency, having a pulse generator and a measuring unit, each electrically connected to the coil. The pulse generator is preferably configured to feed a modulated pulse signal, comprised of pulses separated by intervals and having a modulation frequency different from the resonance frequency, to the coil. The measuring unit is preferably configured to measure a value of a signal output by the coil during an interval of the modulated pulse signal. In a further aspect of the invention a method is provided for driving and measuring the MEMS mirror system.

20 Claims, 3 Drawing Sheets

APPARATUS AND METHOD FOR DRIVING AND MEASURING A MEMS MIRROR SYSTEM

CROSS-REFERENCE TO RELATED APPLICATION

This application claims priority to European Patent Application No. 14 166 714.7, filed on Apr. 30, 2014, the entirety of which is incorporated by reference herein.

BACKGROUND

The present invention relates to an apparatus for driving and measuring a MEMS mirror system, the MEMS mirror system having a mirror pivotable around an axis by a driving coil and exhibiting a resonance frequency. The invention further relates to a method for driving and measuring said MEMS mirror system.

Mirror systems in the form of micro-electro-mechanical systems (MEMS) are known in the art as devices capable of pivoting a mirror around an axis at a high frequency, e.g. in order to deflect a laser beam in a specific direction. This can be used for projectors which project light along a viewing zone, e.g. with a rate of a few thousand cycles per second.

One type of state of the art MEMS mirror systems, e.g. as disclosed in EP 1 515 424 A2, drives the mirror by oscillating it around an axis at a resonance frequency, yielding a sinusoidal oscillation of the mirror. In such MEMS mirror systems the mirror is driven by feeding a pulse train with the resonance frequency into a coil attached to the mirror and lying in a magnetic field. At times when there is no pulse fed into the system, the counter-voltage induced by the movement of the coil in the magnetic field can be measured and used to tune the pulse frequency and phase in order to maintain a fixed amplitude of the mirror movement based on the measured amplitude and phase of the induced signal. However, the movement of the resonating mirror is restricted to a sinusoidal pattern of a varying, non-linear angular velocity, making it unsuitable for a series of applications. Furthermore, the mirror can be driven at the resonance frequency of the MEMS mirror system only. Since this resonance frequency is subject to the physical properties of the system, it cannot be changed readily.

Other types of state of the art MEMS mirror systems, as disclosed in, e.g. Arda D. Yalcinkaya et al., "Two-Axis Electromagnetic Microscanner for High Resolution Displays", IEEE Journal of Microelectromechanical Systems, Vol. 15, No. 4, August 2006, pp. 786-794, drive the mirror at a constant angular velocity by feeding a triangular or sawtooth signal with a frequency well below the resonance frequency to the coil to avoid the mirror accidentally changing into a sinusoidal oscillating state. With this type of driving system, a movement of the mirror can only be determined by observing the actual optical deflection of the laser beam, e.g. on a test screen. This necessitates an external physical test setup and is particularly complex when a whole array of MEMS mirror systems, e.g. as part of a display, is to be observed.

BRIEF SUMMARY OF THE INVENTION

It is an object of the invention to provide an improved apparatus and method for driving and measuring a MEMS mirror system which overcomes the above-mentioned drawbacks of the state of the art.

To this end, in a first aspect the invention provides for an apparatus of the aforementioned type, which is distinguished by a pulse generator and a measuring unit, each electrically connected to the coil; wherein the pulse generator is configured to feed a modulated pulse signal, comprised of pulses separated by intervals and having a modulation frequency different from the resonance frequency, to the coil; and wherein the measuring unit is configured to measure a value of a signal output by the coil during an interval of the modulated pulse signal.

In a second aspect of the invention a method for driving and measuring a MEMS mirror system is provided, the MEMS mirror system having a mirror pivotable by a driving coil and exhibiting a resonance frequency, comprising feeding a modulated pulse signal, comprised of pulses separated by intervals and having a modulation frequency different from the resonance frequency, to the coil; and measuring a value of a signal output by the coil during an interval of the modulated pulse signal to determine an angular velocity of the mirror.

According to the invention, a modulated pulse signal with any desired waveform can be chosen. The modulated pulse signal can be modulated by any pulse modulation technique, e.g. by pulse-width modulation (PWM), pulse-amplitude modulation (PAM), pulse-position modulation (PPM), a combination thereof or any other kind of pulse modulation technique providing a signal comprising pulses separated by intervals. In one embodiment, the modulated pulse signal is a pulse-width modulated signal, a pulse-amplitude modulated signal or a pulse-position modulated signal, resulting from a PWM, a PAM or a PPM, respectively.

The invention allows to impart or force any desired movement pattern onto the mirror, e.g. a triangular or sawtooth pattern to deflect a laser beam linearly. At the same time, the resulting pulse modulated drive signal for the mirror features intervals which can be used to measure the forced movement of the mirror. This measurement is done purely electrically without the need for an external optical measurement of the deflected laser beam or separate sensors inside the MEMS mirror system just by using the existing two terminals of the driving coil at which the modulated pulse signal is input. It is thus possible to obtain information on the actual movement caused by a drive signal of arbitrary form.

The invention is especially useful in displays with huge numbers of individual MEMS mirror systems as pixels in an array since each MEMS mirror system can be measured during the operation of the display in real-time ("online"). Thereby, the display may be calibrated by measuring and subsequently calibrating each individual pixel, or the performance, long-term calibration, stability, ageing, temperature compensation, etc. of the display can be measured, or individual faulty MEMS mirror systems can be singled out, etc. A further most useful application of the invention is to monitor whether the mirror of a MEMS mirror system is reacting to the drive signal at all. An alarm or emergency switch-off is performed in case of a non-movement ("freezing") of the mirror, which would cause the laser beam to be deflected in a single direction. Such a stationary laser beam could cause hazards, e.g. by harming a human eye. These scenarios can be readily prevented with the method and apparatus of the invention at hand.

Each signal value sampled in an interval of the pulse modulated drive signal is a measure of the momentary angular velocity of the mirror attached to the coil pivoting in the magnetic field of the MEMS mirror system. Thus, a series of signal values taken in successive intervals represents a time-discrete (sampled) angular velocity signal. In an embodiment of the invention, this angular velocity signal can be integrated over time to yield the momentary angular position of the mirror; a series of integrated signal values thus represents a time-discrete (sampled) angular position signal of the mirror.

Both the angular velocity signal and the angular position signal of the mirror can be evaluated further by a variety of signal analysis means and methods, leading to further embodiments of the invention. For example, the signals can be analyzed to determine a continuing zero value, a peak value, a mean value, and/or one or more frequency components thereof.

By determining a continuing zero value, i.e. a zero value of the angular velocity or position signal which continues over an extended period of time, e.g. over one or more cycles of the modulation frequency, a non-movement or "freezing" of the mirror can be readily detected. By determining peak and/or mean values and comparing them to reference values or observing them over time, the maximum amplitude of the mirror movement and/or a mean position of the mirror and thus the calibration state of the MEMS mirror system can be measured and monitored, for example to detect a discalibrated or uncalibrated state, an abnormal behaviour or an ongoing degradation, e.g. due to thermal wear or ageing, both in a single MEMS mirror system and in an array of MEMS mirror systems of a display. By analyzing frequency components of these signals, parasitic or interfering frequencies occurring in the MEMS mirror system or an array of MEMS mirror systems, e.g. due to local vibrations, can be identified, measured, and even compensated for by adding an opposite compensation signal to the drive signal.

In a further embodiment of the invention the modulation signal of the modulated pulse signal is an asymmetric triangular or sawtooth signal. This form of signal gives rise to a constant angular velocity of the mirror from a first position to a second and a quick return to the first position once the second position is reached, which is ideally suited for a line-scanning operation of a laser beam. If there are several viewers at a certain distance in front of such a MEMS mirror system, a linear scanning path across a viewing zone is ensured such that each viewer experiences the same quality of projection.

According to another embodiment, measuring the signal value is only performed during intervals of the modulated pulse signal which are longer than a predetermined amount of time, e.g. 1 µs. Depending on the duty cycle, the ratio between pulse frequency and modulation frequency etc., intervals may become very short such that a valid measurement cannot be performed anymore. The above-identified constraint avoids this situation.

In one embodiment, each sample of the induced signal is taken in an interval of the modulated pulse signal at a predetermined time after the beginning of the interval or immediately before the end of the interval. Thereby it can be made sure that the voltage relating to the drive signal fed into the coil has already decayed before the measurement of the induced voltage is performed.

The modulated pulse signal may have a pulse frequency higher than the resonance frequency, and/or the modulation signal has a frequency lower than the resonance frequency. To obtain a smooth mirror movement, the pulse frequency is at least 100 times higher than the resonance frequency, in particular at least 1000 times higher than the resonance frequency. In one embodiment the modulated pulse signal can have a pulse frequency between 100 kHz and 50 MHz, in particular between 2 MHz and 10 MHz, and the modulation frequency is between 1 Hz and 400 Hz, in particular between 40 Hz and 70 Hz.

The method and apparatus of the invention can be applied not only to 1D-MEMS mirror systems explained at the outset wherein the mirror pivots about one axis, but with the same benefits also to 2D-MEMS mirror systems wherein the mirror is pivotable around a further axis so that the MEMS mirror system also exhibits a further resonance frequency. Such 2D-MEMS mirror systems are especially useful for a row and column scanning with a laser beam, where a whole area is to be scanned in a meander-like fashion.

For this application, according to the invention the pulses have a further modulation frequency which is substantially equal to the further resonance frequency, and a filter blocking a frequency component corresponding to the modulation frequency or to the further modulation frequency is provided in the signal path downstream of the measuring unit. The measuring unit thus measures a resulting (superposed) angular velocity of the two angular velocities occurring about each one of the two axes. The filter provides for separating the two angular velocity components so that an analysis of the mirror movement around each one of the axes can then be performed.

BRIEF DESCRIPTION OF THE DRAWINGS

The invention shall now be explained in more detail below on the basis of exemplary embodiments thereof with reference to the accompanying drawings, in which.

DETAILED DESCRIPTION

Figure 1:
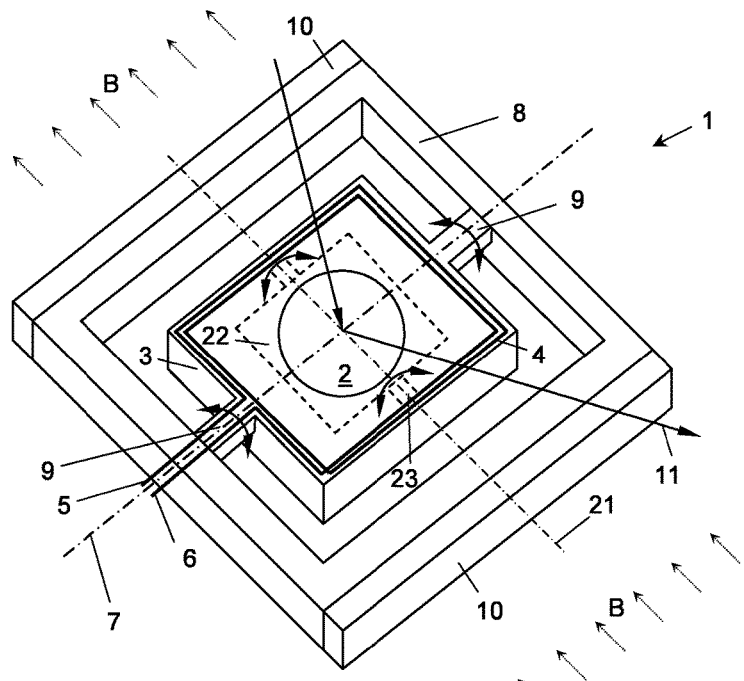
FIG. 1 shows a schematic view of a MEMS mirror system.

In FIG. 1 a MEMS mirror system 1 having a mirror 2 located on a substrate 3 is shown. Attached to the substrate 3 is a driving coil 4 with one or more windings and two terminals 5 and 6, e.g. a rectangular and flat coil with 17 windings. The substrate 3 is mounted pivotably around an axis 7 to a frame 8 of the MEMS mirror system 1 via at least one flexible, optionally elastic connection element 9, e.g., two flat springs at opposite ends of the substrate 3 lying in the axis 7.

A magnetic field B is provided by a magnetic field generation unit 10. The magnetic field generation unit 10 can be of any type known in the art capable of providing a magnetic field B which is substantially homogenous in a region of the driving coil 4, e.g. one or more permanent magnets, an electromagnet etc. The magnetic field B may be normal to the axis 7 and parallel to the plane in which the flat driving coil 4 lies in a rest position, which rest position is essentially defined by the connection element(s) 9.

The mirror 2 of the MEMS mirror system 1 might be used to deflect a light or laser beam 11 in a certain direction, e.g. to construct a steerable light projection pixel for lighting units, beamers, 2D or 3D displays etc.

To alter the direction in which the laser beam 11 is deflected, a drive current is fed through the driving coil 4 by applying a drive voltage across the terminals 5 and 6. Due to the Lorentz force, the component of the current traversing the driving coil 4 normal to the magnetic field B causes the driving coil 4, and thereby the substrate 3 and the mirror 2, to pivot around the axis 7, thus causing the mirror 2 to deflect the laser beam 11 into different directions. Both the drive current and the drive voltage are in the following generally referred to as a drive "signal" fed to the coil 4.

The components of the MEMS mirror system 1, namely the substrate 3, the mirror 2 and the driving coil 4 as a mass unit, the driving coil 4 and its driving circuitry and the magnetic field B as an inductive unit and the flexible connecting element 6 as a tension unit, form an electromechanical oscillator having a resonance frequency $f_r$. If this oscillator is driven by a drive signal with a frequency around the resonance frequency $f_r$, the mirror 2 tends to oscillate sinusoidally with an amplitude amplified proportionally to the oscillator's q-factor, making it very difficult to impart a specific movement pattern to the mirror 2 by means of a specific waveform of the drive signal.

Figure 2:
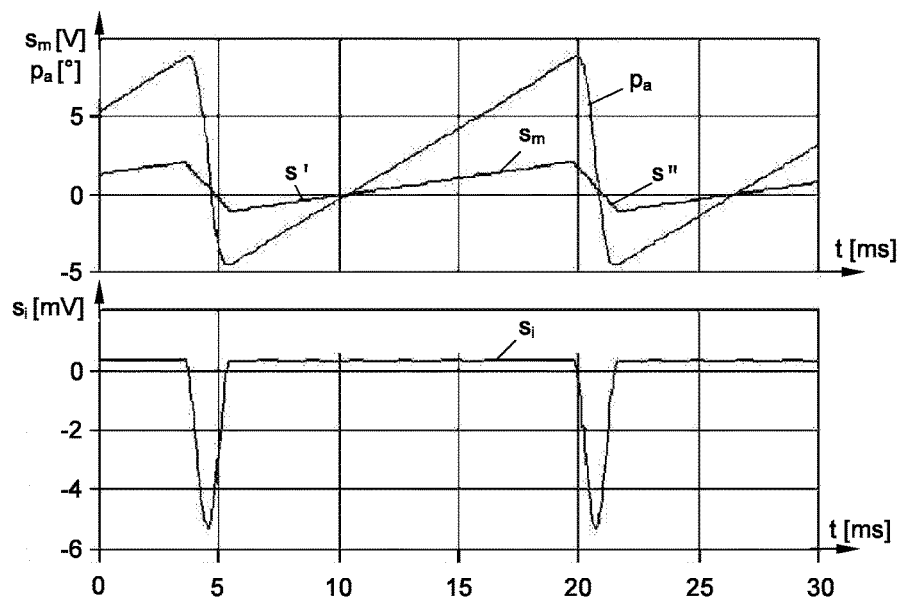
FIG. 2 shows a drive signal and a corresponding angular position over time of the mirror of the MEMS mirror system of FIG. 1 in a first diagram and a simulation of the voltage induced in the coil of the MEMS mirror system of FIG. 1 in a second diagram.

To avoid this resonance state, a drive signal $s_m$ having a frequency $f_m$ significantly lower than the resonance frequency $f_r$ is used. This causes the mirror 2 to follow the waveform of the drive signal $s_m$. FIG. 2 shows in its upper diagram an exemplary drive signal $s_m$ over time t having an approximately asymmetric triangular-like or sawtooth-like waveform and a frequency $f_m$, e.g. of 55 Hz, which, when fed to the coil 4 of a MEMS mirror system 1 with a resonance frequency $f_r$, e.g. of 500 Hz, causes the mirror 2 over time t to oscillate with a corresponding triangular or sawtooth waveform. The angular position $p_a$ of the mirror 2 thus follows the triangular or sawtooth signal $s_m$ without falling into sinusoidal oscillation, as depicted in the upper diagram of FIG. 2. This waveform is particularly useful, e.g. for a line-scanning deflection pattern of the laser beam 11 featuring—within each scan cycle or period of the drive signal $s_m$—a rising slope section s' of substantially constant angular velocity $v_a = dp_a/dt$, followed by a fast falling return section s" for a flyback of the laser scanning beam 11. It is clear that asymmetric triangular or sawtooth waveforms are only two possible examples of waveforms which can be used for the modulation signal $s_m$, other waveforms leading to other movement patterns of the mirror 2. As can readily be seen by the skilled person, it is also possible to use a drive signal $s_m$ without offset, e.g. ranging from −1.5 V to 1.5 V.

Due to the movement of the driving coil 4 in the magnetic field B, a corresponding voltage is induced in the driving coil 4, showing up as a counter-voltage across the terminals 5 and 6, or a corresponding counter-current in a circuitry connected to the terminals 5, 6, respectively. Both terms, induced counter-voltage and induced counter-current are comprised by the term induced "signal" s in the following.

FIG. 2 shows a computer-calculated simulation of the induced signal $s_i$ in its lower diagram; since the drive signal $s_m$ and the induced signal $s_i$ superpose on the terminals 5, 6 of the coil 4 and their respective signal strengths vary by several orders of magnitude, e.g. the drive signal $s_m$ varying between −1 V and 2 V and the induced signal $s_i$ between −5 mV and 2 mV, it is usually not possible to measure the signal $s_i$ at all. To check and measure the movement of the mirror 2 hitherto, the angular position $p_a$ of the deflected laser beam 11 was measured optically, necessitating an external physical setup therefor.

Figure 3A:
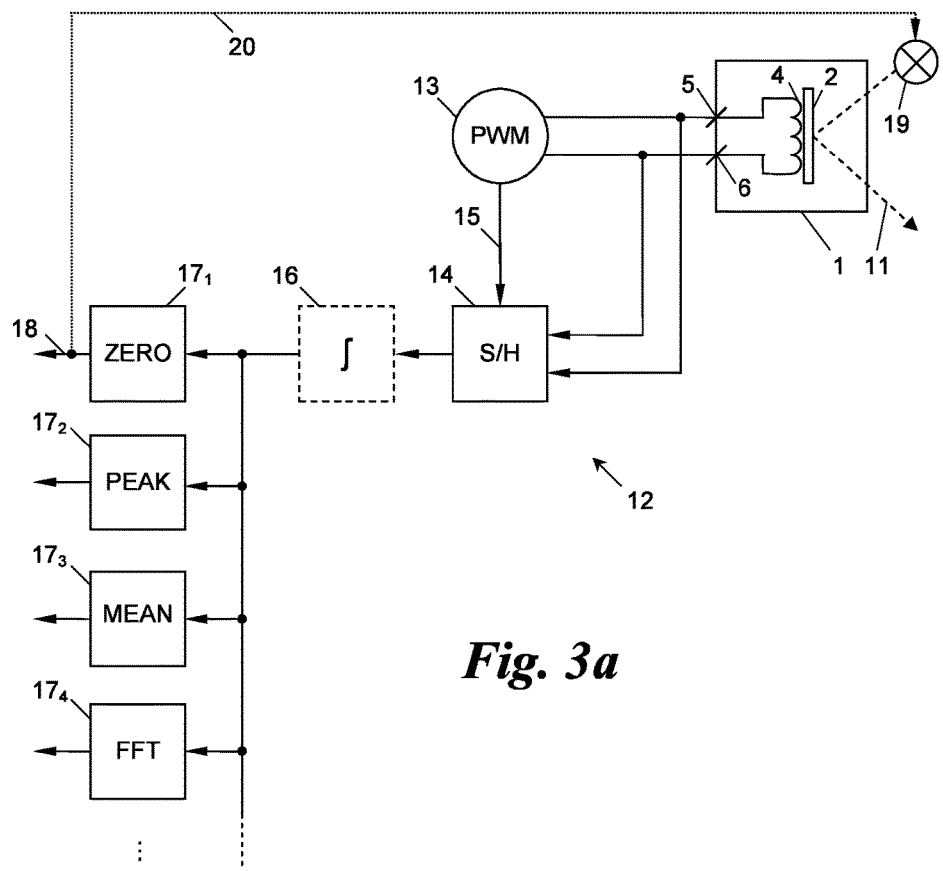
FIG. 3a shows a block diagram of a first embodiment of an apparatus according to the invention for driving and measuring the MEMS mirror system of FIG. 1.
Figure 3B:
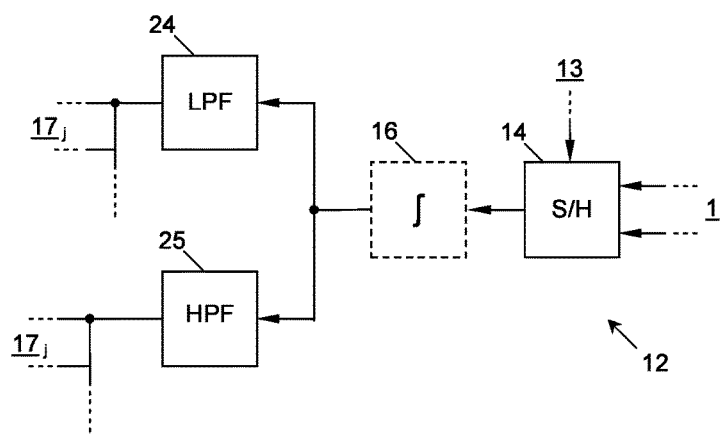
FIG. 3b shows a partial block diagram of a second embodiment of an apparatus according to the invention for driving and measuring the MEMS mirror system of FIG. 1.
Figure 4:
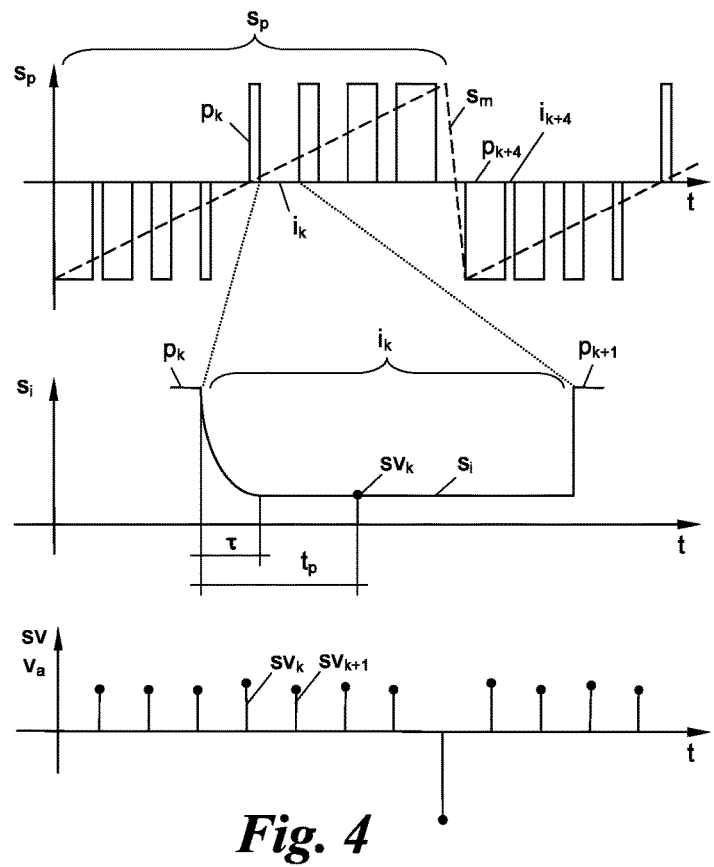
FIG. 4 shows time diagrams of a pulse modulated drive signal fed into the MEMS mirror system of FIG. 1 and of signal values measured during intervals of the pulse modulated signal according to the principles of the method and apparatus of the invention.

FIGS. 3 and 4 show a driving and measuring method and apparatus 12 for the MEMS mirror system 1 capable of overcoming this problem. A pulse generator 13 is configured to modulate the modulation signal $s_m$ via any pulse modulation technique, e.g. pulse-width modulation (PWM), pulse-amplitude modulation (PAM), pulse-position modulation (PPM), etc. or a combination thereof, onto a pulsed carrier signal having a carrier or pulse frequency $f_p$. The pulse frequency $f_p$ is chosen significantly different from the resonance frequency $f_r$, e.g., well above the resonance frequency $f_r$, while the modulation frequency $f_m$ stays well below the resonance frequency $f_r$. In a particular embodiment where the MEMS mirror system 1 has a resonance frequency $f_r$ of 500 Hz, $f_p$ may be in the range of 1-100 kHz and $f_m$ in the range of 40-75 Hz. The resulting modulated pulse signal $s_p$ then consists of a sequence or train of individual pulses $p_k$ (k=1, 2, 3, . . . ) and intervals $i_k$ therebetween. For example, the duty cycle of the modulated pulse signal $s_p$ may range from 5% to 95%, depending on the chosen modulated pulse signal, i.e. varying in case of PWM, fixed in case of PAM.

As shown in FIG. 3a, a measuring unit 14 is connected to the two terminals 5 and 6 of the coil 4 and configured to take samples, i.e. to measure signal values $sv_k$ of the induced signal $s_i$ during the intervals $i_k$ of the pulse modulation drive signal $s_p$. To this end, the measuring unit 14 may be a sample and hold circuit triggered by the pulse generator 13 via a control path or trigger line 15 each time after a new interval $i_k$ has begun.

FIG. 4, first diagram, shows an exemplary modulation signal $s_m$ and an exemplary drive signal $s_p$ (here: in the form of a bipolar PWM signal); FIG. 4, second diagram, shows an exemplary induced signal $s_i$ appearing at the terminals 5, 6 of the coil 4 during an exemplary interval $i_k$ of the drive signal $s_p$ in a time-zoomed scale; and FIG. 4, third diagram, shows exemplary signal values $sv_k$ sampled subsequently in successive intervals $i_1, i_2, \ldots i_k, i_{k+1}, \ldots$ of the drive signal $s_p$ of the first diagram of FIG. 4. For example, the signal values $sv_k$ can be readily scaled to obtain the momentary angular velocity $v_a$, e.g. in units of [°/s].

As can be seen from FIG. 4, the signal values $sv_k$ of the induced signal $s_i$ are substantially constant during a constant movement $v_a$ of the mirror 2 and vary greatly during the rapid movement back from the end position of the mirror 2 to the starting position.

As can further be seen from the second diagram in FIG. 4, it is of some importance at which point during an interval $i_k$ the measurement of the signal value $sv_k$ is taken. After the end of a pulse $p_k$, the signal previously fed to the driving coil 4 decays and reaches an insignificant level after a decay period τ, which depends on the electrical characteristics of the circuitry driving the coil 4, primarily its inductive reactance. In practical embodiments, the decay period τ is in the order of several tens or hundreds of ns. To prevent the measurement of the signal value $sv_k$ being taken at a time when the signal at the terminals 5, 6 due to the previous pulse $p_k$ fed has not yet decayed, i.e. within the decay period τ after the beginning of an interval $i_k$, the measurement is taken a predetermined time $t_p$>τ after the end of a preceding pulse $p_k$. Alternatively, the measurement of the signal value $sv_k$ is taken immediately before the beginning of a succeeding pulse $p_{k+1}$, which minimizes the risk of taking a measurement within the decay period τ. The measurement unit 14 can be synchronized with the pulse generator 13 accordingly via the control path 15.

Furthermore, a constraint can be implemented in both of the above described methods of timing such that measurements are only performed during intervals $i_k$ which are longer than a predetermined amount of time T, e.g. of around 1 μs. Measurements in intervals $i_k$ shorter than the predetermined amount of time T may be skipped.

Since a signal value $sv_k$ taken by the measuring unit 14 represents the momentary angular velocity $v_a$ of the mirror 2, the momentary angular position $p_a$ of the mirror 2 can be obtained by integrating a series of signal values $sv_k$ over time t. To this end, an integrator 16 can be connected to the output of the measuring unit 14. The integrator 16 might, for example, use the beginning or the zero crossing of each cycle of the modulation signal $s_m$ as a starting point of the integration. The integrator 16 then sums up the signal values $sv_k$, each multiplied with the time span lapsed since the preceding signal value $sv_{k-1}$, to obtain integrated signal values $isv_k$ corresponding to the momentary angular position $p_a$.

Figure 5:
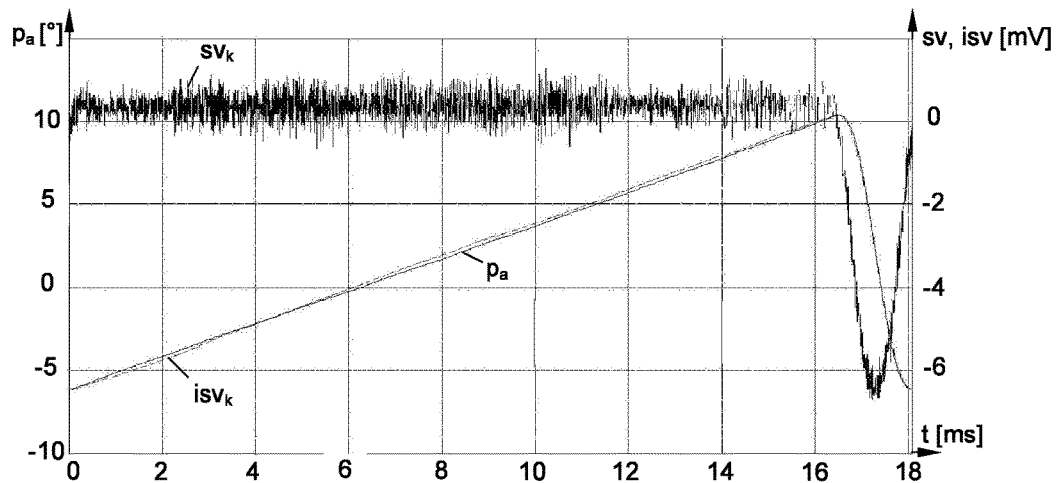
FIG. 5 shows empiric data generated and measured by the apparatus of FIG. 3a according to the principles of FIG. 4.

A recording unit (not shown) can be connected to the measuring unit 14 and/or to the integrator 16 to record and plot the angular velocity $v_a$ and/or angular position $p_a$ over time t, e.g. as shown in FIG. 5 and described in detail below.

For further evaluating the signal values $sv_k$, i.e. the angular velocities $v_a$, and/or the integrated signal values $isv_k$, i.e. the angular positions $p_a$, over time t, one or more signal analysis units $17_j$ (j=1, 2, 3, . . . ) can be connected to the output of the measuring unit 14 and/or the output of the integrator 16.

A first embodiment of a signal analysis unit $17_j$ is, for example, a "no operation" detector $17_1$ which checks whether the mirror 2 is moving at all by detecting the angular velocity $v_a$ or angular position $p_a$ to continuously be substantially zero over an observation time span, e.g. of one or more cycles of the modulation frequency $f_m$. In this way a failure or "freezing" of the mirror movement can be detected and a subsequent alarm can be set off on an output 18 of the detector $17_1$. Alternatively a light source 19 of the laser beam 11 can be switched off via a control path 20 to implement eye-safety standards for viewers of the MEMS mirror system 1.

The signal analysis unit $17_j$ can further be embodied as a peak detection device $17_2$ detecting a peak value, e.g. the global minimum and maximum values of a series of signal values $sv_k$ or integrated signal values $isv_k$, e.g. to determine the maximum amplitude or a highest angular velocity $v_a$ of the mirror movement.

A third embodiment of the signal analysis unit $17_j$ is shown as a mean value detector $17_3$, e.g. determining a mean value of the angular velocity $v_a$ or angular position $p_a$ over a gliding time window. For example, peak and mean values can be used to further evaluate a gradual deviation from reference values, e.g. indicating a decalibration or ageing of the MEMS mirror system 1 or its driving circuitry.

A fourth exemplary embodiment of the signal analysis unit $17_j$ is a frequency analyzer $17_4$, by means of which certain frequency components of the angular velocity $v_a$ and/or angular position $p_a$, e.g. corresponding to parasitic or interfering frequencies, can be discovered, which may be caused by unwanted mechanical vibrations of the system 1.

FIG. 5 shows an example of measurements performed on the MEMS mirror system 1 with the apparatus 12 and method described herein. The modulation frequency $f_m$ was set at 55 Hz and the PWM pulse frequency $f_p$ at 453 kHz, the MEMS mirror system 1 exhibiting a resonance frequency $f_r$ of approximately 500 Hz. 4900 signal values $sv_k$ of the induced signal $s_i$ were measured in intervals $i_k$. The top curve shows the signal values $sv_k$ over time t, corresponding to the momentary angular velocity $v_a$ of the mirror 2. Upon integration, the momentary angular position $p_a$, according to the integrated signal values $isv_k$, was obtained (dashed line). To compare these results, the actual momentary angular position $p_a$ of the mirror 2 was obtained (solid line) by measuring the actual deflection angle of the laser beam 11 reflected by the mirror 2 onto a test screen. As can be seen, the angular position as obtained by the two different measuring methods differ only marginally.

Up to now, a 1D-MEMS mirror system 1 was considered, wherein the mirror 2 pivots about one single axis 7. The method and apparatus 12 described herein can, however, also be used for driving and measuring 2D-MEMS mirror systems 1 wherein the mirror 2 performs a further (second) pivoting movement about a further (second) axis 21 which is usually (but not necessarily) orthogonal to the first axis 7. To this end, FIG. 1 schematically shows in dashed lines a second substrate 22 located within the driving coil 4 and pivotingly mounted on the first substrate 3 around the axis 21 by means of at least one further elastic connection element 23. For this embodiment, the magnetic field lines of the magnetic field B are still oriented parallel to the plane of the flat driving coil 4, but at an angle of 45° (not shown) with respect to the first axis 7 and the second axis 21, respectively.

Thus the oscillator relating to the 2D-MEMS mirror system 1 of FIG. 1 exhibits a further (second) resonance frequency $f_r'$ corresponding to the second electro-mechanical system built around the second axis 21. Since the mirror 2 is to be pivoted around two axes 7, 21 with a single driving coil 4, the drive signal to be fed into the driving coil 4 has to accommodate for both of the frequencies $f_m$, $f_m'$ at which the mirror 2 is to be pivoted around each one of the axes 7, 21. To this end, the modulation signal $s_m$ is a superposed signal having two modulation frequencies $f_m$, $f_m'$. The mirror 2 is to be pivoted around the axis 7 with the first frequency $f_m$ different from the resonance frequency $f_r$ and around the axis 21 with the second modulation frequency $f_m'$ corresponding to the further resonance frequency $f_r'$. This setup is chosen since the driving coil 4 is located on the substrate 3 only, thereby making it harder for the second substrate 22 to be pivoted around the further axis 21 unless excited at the second resonance frequency $f_r'$.

The induced signal $s_i$ measured by the measuring unit 14 gives rise to a resulting angular velocity in which both the first angular velocity $v_a$ around the axis 7 and the second angular velocity $v_a'$ around the further axis 21 are manifested. To separate the two velocity components $v_a$, $v_a'$—or the respective position components $p_a$, $p_a'$—two filters 24, 25 can be connected to the measuring unit 14, or to the integrator 16, respectively, see FIG. 3b. The filters 24, 25 can be of any type, e.g. band pass filters, notch filters, highpass filters, lowpass filters etc., as long as each filter blocks at least one of the two modulation frequencies $f_m$, $f_m'$ and lets the other pass. Following the filtering of the frequencies $f_m$, $f_m'$, the velocity components $v_a$, $v_a'$ can each be integrated and analyzed separately as described above or, if the filters 24, 25 are connected downstream of the integrator 16, the position components $p_a$, $p_a'$ can be analysed separately as described above, by means of one or more of the signal analysis units $17_j$.

The invention is not restricted to the specific embodiments described in detail herein, but encompasses all variants, combinations and modifications thereof that fall within the framework of the appended claims.

What is claimed is:

1. An apparatus for driving and measuring a MEMS mirror system, the MEMS mirror system having a mirror pivotable around an axis by a driving coil and exhibiting a resonance frequency, comprising:
    a pulse generator and a measuring unit, each electrically connected to the coil;
    the pulse generator being configured to feed a modulated pulse signal, comprised of pulses separated by intervals and having a modulation frequency different from the resonance frequency, to the coil;
    the measuring unit being configured to measure a value of a signal output by the coil during an interval of the modulated pulse signal; and
    an integrator connected to the measuring unit, the integrator being configured to integrate a series of signal values output by the measuring unit.

2. The apparatus of claim 1, wherein the modulated pulse signal is a pulse-width modulated signal, a pulse-amplitude modulated signal or a pulse-position modulated signal.

3. The apparatus of claim 1, further comprising a first signal analysis unit connected to the measuring unit, the first signal analysis unit being configured to determine at least one of a continuing zero value, a peak value, a mean value, and a frequency component of a series of signal values output by the measuring unit.

4. The apparatus of claim 1, further comprising a second signal analysis unit connected to the measuring unit, the second signal analysis unit being configured to determine at least one of a continuing zero value, a peak value, a mean value, and a frequency component of a series of integrated signal values output by the integrator.

5. The apparatus of claim 1, the mirror of the MEMS mirror system to be driven and measured being pivotable around a further axis so that the MEMS mirror system also exhibits a further resonance frequency;
    wherein the modulated pulse signal has a further modulation frequency which is substantially equal to the further resonance frequency; and
    wherein a filter blocking a frequency component corresponding to the modulation frequency or to the further modulation frequency is provided in the signal path downstream of the measuring unit.

6. An apparatus for driving and measuring a MEMS mirror system, the MEMS mirror system having a mirror pivotable around an axis by a driving coil and exhibiting a resonance frequency, comprising:
    a pulse generator and a measuring unit, each electrically connected to the coil;
    the pulse generator being configured to feed a modulated pulse signal, comprised of pulses separated by intervals and having a modulation frequency different from the resonance frequency, to the coil;
    the measuring unit being configured to measure a value of a signal output by the coil during an interval of the modulated pulse signal, wherein the modulation signal of the modulated pulse signal is an asymmetric triangular or sawtooth signal.

7. The apparatus of claim 6, wherein the modulated pulse signal is a pulse-width modulated signal, a pulse-amplitude modulated signal or a pulse-position modulated signal.

8. The apparatus of claim 6, further comprising a first signal analysis unit connected to the measuring unit, the first signal analysis unit being configured to determine at least one of a continuing zero value, a peak value, a mean value, and a frequency component of a series of signal values output by the measuring unit.

9. A method for driving and measuring a MEMS mirror system, the MEMS mirror system having a mirror pivotable by a driving coil and exhibiting a resonance frequency, comprising:
    feeding a modulated pulse signal, comprised of pulses separated by intervals and having a modulation frequency different from the resonance frequency, to the coil; and
    measuring a value of a signal output by the coil during an interval of the modulated pulse signal to determine an angular velocity of the mirror;
    repeating the step of measuring at least once, to obtain a series of measured signal values; and
    integrating the series of measured signal values to determine an angular position of the mirror.

10. The method of claim 9, wherein the modulated pulse signal is a pulse-width modulated signal, a pulse-amplitude modulated signal or a pulse-position modulated signal.

11. The method of claim 10, further comprising:
    repeating the step of measuring at least once to obtain a series of measured signal values; and
    determining at least one of a continuing zero value, a peak value, a mean value, and a frequency component of the series of measured signal values.

12. The method of claim 9, further comprising:
    repeating the step of integrating at least once, each time for a different series of measured signal values, to obtain a series of integrated signal values; and
    determining at least one of a continuing zero value, a peak value, a mean value, and a frequency component of the series of integrated signal values.

13. The method of claim 9, wherein measuring the signal value is only performed during intervals of the modulated pulse signal which are longer than a predetermined amount of time.

14. The method of claim 9, wherein measuring the signal value is performed at a predetermined time after the beginning of the interval or immediately before the end of the interval.

15. The method of claim 9, the mirror of the MEMS mirror system to be driven and measured being pivotable around a further axis so that the MEMS mirror system also exhibits a further resonance frequency, further comprising:
    the modulated pulse signal having a further modulation frequency substantially equal to the further resonance frequency;
    repeating the step of measuring at least once, to obtain a series of measured signal values; and
    blocking a frequency component corresponding to the modulation frequency or to the further modulation frequency from the series of measured signal values.

16. A method for driving and measuring a MEMS mirror system, the MEMS mirror system having a mirror pivotable by a driving coil and exhibiting a resonance frequency, comprising:
    feeding a modulated pulse signal, comprised of pulses separated by intervals and having a modulation frequency different from the resonance frequency, to the coil; and
    measuring a value of a signal output by the coil during an interval of the modulated pulse signal to determine an angular velocity of the mirror, wherein the modulation signal of the modulated pulse signal is a triangular or sawtooth signal.

17. A method for driving and measuring a MEMS mirror system, the MEMS mirror system having a mirror pivotable by a driving coil and exhibiting a resonance frequency, comprising:

feeding a modulated pulse signal, comprised of pulses separated by intervals and having a modulation frequency different from the resonance frequency, to the coil; and measuring a value of a signal output by the coil during an interval of the modulated pulse signal to determine an angular velocity of the mirror;

wherein measuring the signal value is only performed during intervals of the modulated pulse signal which are longer than a predetermined amount of time; and wherein said predetermined amount of time is 1 µs.

18. A method for driving and measuring a MEMS mirror system, the MEMS mirror system having a mirror pivotable by a driving coil and exhibiting a resonance frequency, comprising:

feeding a modulated pulse signal, comprised of pulses separated by intervals and having a modulation frequency different from the resonance frequency, to the coil; and measuring a value of a signal output by the coil during an interval of the modulated pulse signal to determine an angular velocity of the mirror, wherein the modulated pulse signal has a pulse frequency between 100 kHz and 50 MHz and the modulation frequency is between 1 Hz and 500 Hz.

19. The method of claim 18, wherein the modulated pulse signal has a pulse frequency between 2 MHz and 10 MHz.

20. The method of claim 18, wherein the modulation frequency is between 40 Hz and 70 Hz.

* * * * *